(12) United States Patent
Hoeckelman

(10) Patent No.: US 7,596,846 B2
(45) Date of Patent: Oct. 6, 2009

(54) CLAMPING FASTENER GRIP LENGTH INDICATOR

(75) Inventor: Leslie A. Hoeckelman, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 588 days.

(21) Appl. No.: 11/383,172

(22) Filed: May 12, 2006

(65) Prior Publication Data

US 2006/0193709 A1    Aug. 31, 2006

Related U.S. Application Data

(62) Division of application No. 10/966,178, filed on Oct. 15, 2004, now Pat. No. 7,070,375.

(51) Int. Cl.
| | |
|---|---|
| *B23Q 17/00* | (2006.01) |
| *E01B 3/00* | (2006.01) |
| *F16B 13/06* | (2006.01) |
| *F16B 31/02* | (2006.01) |
| *G01B 5/20* | (2006.01) |
| *G01B 3/12* | (2006.01) |
| *G09F 9/00* | (2006.01) |
| *H03J 1/00* | (2006.01) |

(52) U.S. Cl. .................. 29/407.1; 33/554; 33/679.1; 33/774; 33/806; 116/259; 116/321; 269/48.3; 269/48.4; 411/14; 411/54

(58) Field of Classification Search .............. 29/407.1; 33/554, 679.1, 774, 806, 810; 269/48.2–48.4; 116/259, 321; 411/14, 54
See application file for complete search history.

(56) References Cited

U.S. PATENT DOCUMENTS

| | | | |
|---|---|---|---|
| 517,073 A | 3/1894 | Sloane | |
| 536,676 A | 4/1895 | Wilcox | |
| 1,375,747 A | 4/1921 | Zigray | |
| 1,383,340 A * | 7/1921 | Robbins et al. | ............... 33/774 |
| 2,241,609 A | 5/1941 | McClelland et al. | |
| 2,293,411 A | 8/1942 | Spillman | |
| 2,294,013 A | 8/1942 | Wallace | |
| 2,295,783 A | 9/1942 | Greenleaf | |
| 2,317,315 A | 4/1943 | Wallace | |
| 2,354,480 A | 7/1944 | Rossmann | |
| 2,365,787 A | 12/1944 | Wallace | |
| 2,439,531 A | 4/1948 | Wallace | |
| 2,446,030 A | 7/1948 | Poynder Tunnard-Moore | |

(Continued)

*Primary Examiner*—David P Bryant
*Assistant Examiner*—Alexander P Taousakis
(74) *Attorney, Agent, or Firm*—Yee & Associates, P.C.; Dennis R. Plank

(57) ABSTRACT

A temporary fastener includes a grip length indicator. By machining a flattened area into a body of the temporary fastener, by engraving an scale into the flattened area, and by attaching an indicator dot visible in the groove to a moving part of an internal assembly of the temporary fastener, the grip length of the installed temporary fastener may be read directly on the scale while the temporary fastener applies a clamp-up force to a structure. By using the temporary fastener of the present invention, it is possible to determine a fastener hole length while a temporary fastener is installed. Using the method for determining a fastener grip length of the present invention enables the effective determination of the correct fastener grip length for each particular fastener hole of a large structure, such as an aircraft airframe.

12 Claims, 4 Drawing Sheets

U.S. PATENT DOCUMENTS

| | | |
|---|---|---|
| 2,484,458 A | 10/1949 | Henry |
| 2,579,956 A * | 12/1951 | Owen .................... 33/774 |
| 2,755,541 A | 7/1956 | Kruger |
| 2,894,331 A | 7/1959 | Stratman |
| 3,000,086 A | 9/1961 | Davis |
| 3,016,619 A | 1/1962 | Mueller |
| 3,144,804 A | 8/1964 | Harwood |
| 3,144,805 A | 8/1964 | Lee |
| 3,225,447 A | 12/1965 | Bryant |
| 3,260,151 A | 7/1966 | Jones |
| 3,289,525 A | 12/1966 | Lee |
| 3,426,399 A | 2/1969 | Jones |
| 3,568,562 A | 3/1971 | Harwood |
| 3,751,083 A | 8/1973 | Jacobson et al. |
| 3,869,801 A | 3/1975 | Lyan |
| 4,033,043 A | 7/1977 | Cunningham |
| 4,237,612 A | 12/1980 | Christian et al. |
| 4,399,685 A | 8/1983 | Atkey |
| 4,537,542 A | 8/1985 | Pratt et al. |
| 4,548,533 A | 10/1985 | Pratt |
| 4,763,459 A | 8/1988 | Wesselski |
| 4,787,274 A | 11/1988 | Belanger |
| 4,858,607 A | 8/1989 | Jordan et al. |
| 4,876,800 A | 10/1989 | Pekar et al. |
| 4,892,449 A | 1/1990 | Croxton |
| 4,899,431 A | 2/1990 | Borntrager |
| 4,934,885 A | 6/1990 | Woods et al. |
| 4,936,726 A | 6/1990 | Medard |
| 4,972,603 A | 11/1990 | Meyer |
| 5,048,805 A | 9/1991 | Wiseman |
| 5,095,638 A | 3/1992 | David |
| 5,164,154 A | 11/1992 | Brown et al. |
| 5,228,731 A | 7/1993 | Glass |
| 5,240,361 A | 8/1993 | Armstrong et al. |
| 5,439,310 A | 8/1995 | Evenson et al. |
| 5,469,629 A | 11/1995 | Rogler |
| 5,538,381 A | 7/1996 | Erbes |
| 5,702,401 A | 12/1997 | Shaffer |
| 5,927,919 A | 7/1999 | Blankenship et al. |
| 6,017,136 A | 1/2000 | Burton |
| 6,056,283 A | 5/2000 | Gage et al. |
| 6,196,779 B1 | 3/2001 | Falk |
| 6,346,114 B1 | 2/2002 | Schraga |
| 6,450,976 B2 | 9/2002 | Korotko et al. |
| 6,508,012 B2 | 1/2003 | Wells, Jr. |
| 6,755,407 B1 | 6/2004 | Olson et al. |
| 6,827,345 B2 | 12/2004 | Anderson et al. |

* cited by examiner

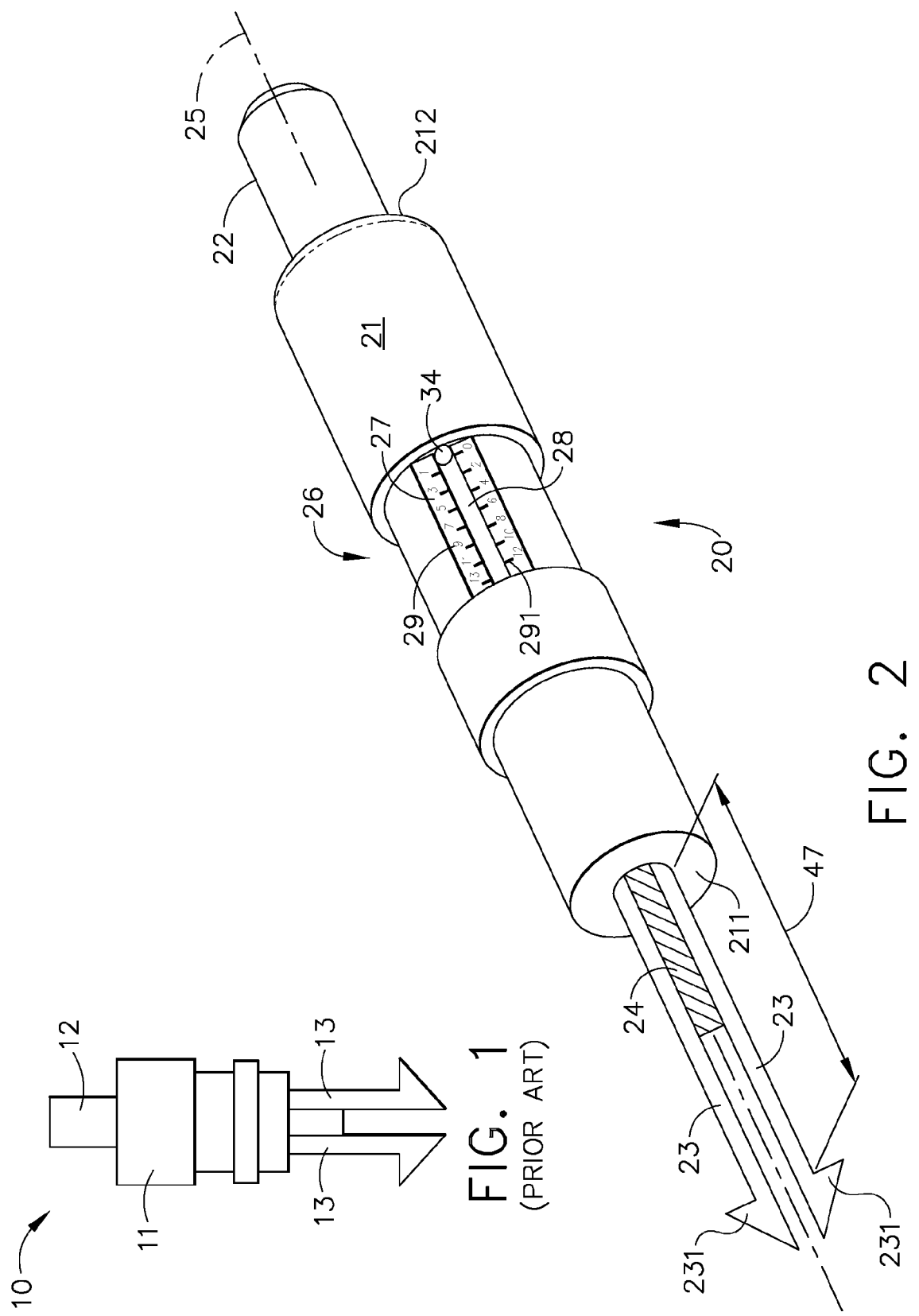

CLAMPING FASTENER GRIP LENGTH INDICATOR

CROSS REFERENCE TO RELATED APPLICATIONS

The present application is a divisional application of the U.S. patent application Ser. No. 10/966,178, filed on Oct. 15, 2004 now U.S. Pat. No. 7,070,375.

BACKGROUND OF THE INVENTION

The present invention generally relates to structural fasteners and length measurements, and more particularly, to a grip length indicator integrated into a temporary clamping fastener, and to a method for determining a fastener grip length.

Structural fasteners come in varying length to accommodate any thickness of structures. The thickness of a structure may vary and, consequently, each hole where a fastener is to be installed needs to have its length measured in order to select and install the correct length fastener. Selecting the correct grip length of a fastener is critical in many applications, such as aircraft airframe installation. If a structural fastener is used that does not have the correct length, it may not be possible to install the fastener correctly and the joint strength may be reduced. To ensure the correct installation of fasteners, numerous types of measuring devices are available to measure the length of the hole where the fastener is to be installed. Typically, such measuring devices are gauges that include a measuring scale and that are formed like a fishhook. Such gauges can be hooked on the backside of a fastener hole, and the number at the scale that is even with the front side of the structure indicates the length of the hole. Usually, if the reading is between increments, the next higher increment is used for the selection of the fastener to be installed. Other measuring devices may require calibration. The gauging process of the fastener holes is typically done manually. In an installation process, for example, the installation of an aircraft airframe, the step of measuring the length of fastener holes is a very important step to ensure the correct selection of the fastener grip length and the correct installation of fasteners, but it is also a time consuming necessary step that slows the product flow. Furthermore, should a fastener be installed incorrectly because of use of an incorrect fastener length, the fastener would need to be removed and replaced, resulting in significant rework and potential damage to the structure.

Many structures, for example, in the aerospace industry or in the automobile industry, require temporary fasteners to be installed. Temporary fasteners hold the material in place until it is ready to be fastened permanently. Temporary fasteners are typically installed in structures that consist of a plurality of panels, such as a skin, a sealer or shim, and a substructure, for example, of an aircraft airframe. In an installation process, for example, of an aircraft airframe, temporary fasteners may be inserted into fastener holes in a first step. The temporary fasteners might need to be removed one by one and the length of each fastener hole might need to be measured in a subsequent step before the permanent fastener can be selected and installed. This process is time consuming and increases the cycle time.

Existing temporary structural fasteners include, for example, Wedgelock™ temporary fasteners manufactured by Monogram Aerospace Fasteners, Los Angeles, Calif., U.S.A. Wedgelock™ temporary fasteners are frequently used, for example, in the aircraft airframe installation process to temporarily hold a structure, such as substructure, sealant, and outer mold line skin, together. The Wedgelock™ temporary fastener is similar to the temporary fastener 10, as illustrated in FIG. 1. Temporary fastener 10 is a temporary blind fastener that has a cylindrical body 11. The cylindrical design eliminates fastener-to-tool orientation problems. The temporary fastener 10 further includes a captive nut 12, double lead thread (not shown), and larger geometry bearing wires 13. Utilization of a captive nut 12 provides a positive disengagement, allowing unobstructed removal of the fastener even if used in wet sealant applications. The double lead thread design (not shown) further enhances overall installation and removal efficiency while the large bearing area makes this type of fastener the optimum choice for both composite and metallic structures. The temporary fastener 10 is a power operated reusable temporarily fastener and may be installed and removed manually, automatically, or by a robot. Using the temporary fastener 10 may improve the installation and removal efficiency for temporarily fastening structures, but the temporary fastener 10 still needs to be removed from a structure to allow access to the fastener hole to be measured using a separate measuring device.

As can be seen, there is a need for a measuring device that enables accurate and efficient determination of a fastener hole length. Furthermore, there is a need to eliminate the step of gauging the fastener hole after the installation of temporary fasteners in order to reduce cycle time. Moreover there is a need to enable correct selection of the fastener grip length of the fastener to be installed.

There has, therefore, arisen a need to provide modifications to existing temporary fasteners that enable accurate determination of a fastener hole length without removal of the temporary fastener from the fastener hole. There has further arisen a need to eliminate the step of measuring fastener holes between the temporarily and the permanent installation of a fastener. There has still further arisen a need to provide a method for effectively determining of the correct fastener grip length for fastener holes of a large structure, such as an aircraft airframe.

SUMMARY OF THE INVENTION

The present invention provides grip length indicator integrated into a temporary clamping fastener, and to a method for determining fastener grip length. The present invention enables the determination of the grip length of a fastener while a structure is in a clamped-up position. The present invention further provides a clamping fastener grip length indicator that is suitable for, but not limited to, applications in the aerospace industry, for example, in the installation process of an aircraft airframe.

In one aspect of the present invention, a temporary fastener comprises a body housing an internal assembly, two bearing wires extending the body for a grip length and being in a fixed connection with the internal assembly, and a grip length indicator integrated in the body and the internal assembly.

In another aspect of the present invention, a grip length indicator comprises a flattened area machined into the body of a temporary clamping fastener, a groove cut into the body of the temporary fastener, and an indicator dot visible in the groove. The groove extends longitudinally within the flattened area.

In still another aspect of the present invention, a grip length indicator comprises a flattened area machined into the body of a temporary fastener, a scale having graduation marks in grip lengths a groove cut into the body of the temporary fastener, and an indicator dot visible in the groove. The position of the indicator dot on the scale is equivalent with the grip length of the temporary fastener after installation of the fastener. The temporary fastener has a grip length. The scale references the grip length of the temporary fastener. The groove extends longitudinally within the flattened area.

In a further aspect of the present invention, a temporary fastener comprises an axis, a body having a cylindrical shape, a front end, and a back end, an internal assembly, two bearing wires extending the body at the front end along the axis, a wedge positioned between the two bearing wires, a nut screwed onto the threaded shaft proximate to the back end, and a grip length indicator. The body extends longitudinally along the axis. The body is held stationary. The internal assembly includes a threaded shaft, and a hexagonal part. The threaded shaft has a front end and a back end and extends longitudinally along the axis. The hexagonal part is mechanically attached to the front end of the shaft. The bearing wires are in a fixed connection with the hexagonal part. Each of the bearing wires includes a hook. The distance from the body to the hooks is the grip length. The wedge pushes the bearing wires apart. The nut is rotated. The grip length indicator includes a flattened area machined into a section of the body, a scale having graduation marks in grip lengths (typically 1/16 inch increments) included in the flattened area, a groove cut into the body and extending along the axis within the flattened area, and an indicator dot permanently attached to the hexagonal part of the internal assembly. The indicator dot is visible in the groove. The position of the indicator dot on the scale is equivalent with the grip length.

In still a further aspect of the present invention, an aircraft airframe assembly comprises a substructure, an outer mold line skin fitted on the substructure, a fastener hole extending through the substructure and through the skin, and a temporary fastener installed in the fastener hole. The substructure and the outer mold line skin form a structure having an outer mold line and an inner mold line. The fastener hole extends from the outer mold line to the inner mold line. The temporary fastener applies a clamp-up force to the substructure and the outer mold line skin. The temporary fastener includes a body housing an internal assembly, two bearing wires extending the body for a grip length and being in a fixed connection with the internal assembly, and a grip length indicator integrated in the body and the internal assembly. The housing is in contact with the outer mold line of the structure. The bearing wires include two hooks that are in contact with the inner mold line. The grip length indicator indicates the distance from the outer mold line to the inner mold line of the structure.

In still a further aspect of the present invention, a method for determining a fastener hole length comprises the steps of: inserting a temporary fastener including a grip length indicator into a fastener hole of a structure having a thickness; applying a clamp-up force to the structure with the temporary fastener; and reading the grip length indicator to determine the thickness of the structure.

In still a further aspect of the present invention, a method for determining a fastener hole length comprises the steps of: machining a flattened area into a temporary fastener, engraving a scale into the flattened area, cutting a groove into the flattened area, observing an indicator dot through the groove, inserting the temporary fastener into a fastener hole having a length, applying a clamp-up force to a structure with the temporary fastener, and reading the scale at position of the indicator dot to determine fastener hole length.

In still another aspect of the present invention, a method for determining a fastener grip length of a fastener used in an aircraft airframe assembly comprises the steps of: machining a flattened area into a body of a temporary fastener, engraving a scale into the flattened area, cutting a groove into the body within the flattened area, attaching an indicator dot to a moving part of an internal assembly of the temporary fastener. The method for determining a fastener grip length further includes the steps of: inserting bearing wires of the temporary fastener into a fastener hole of the airframe assembly having an inner mold line and an outer mold line, positioning the body on the outer mold line, retracting the bearing wires by moving the internal assembly until the bearing wires contact the inner mold line, applying a clamp-up force to the airframe assembly, reading the scale at position of the indicator dot to determine distance from the inner mold line to the outer mold line, and selecting the fastener to installed in the airframe assembly.

These and other features, aspects and advantages of the present invention will become better understood with reference to the following drawings, description and claims.

BRIEF DESCRIPTION OF THE DRAWINGS

FIG. 1a is a schematic front view of a prior art temporary fastener;

FIG. 2 is a perspective side view of a temporary fastener with integrated grip length indicator according to one embodiment of the present invention;

DETAILED DESCRIPTION OF THE INVENTION

Figure 3:
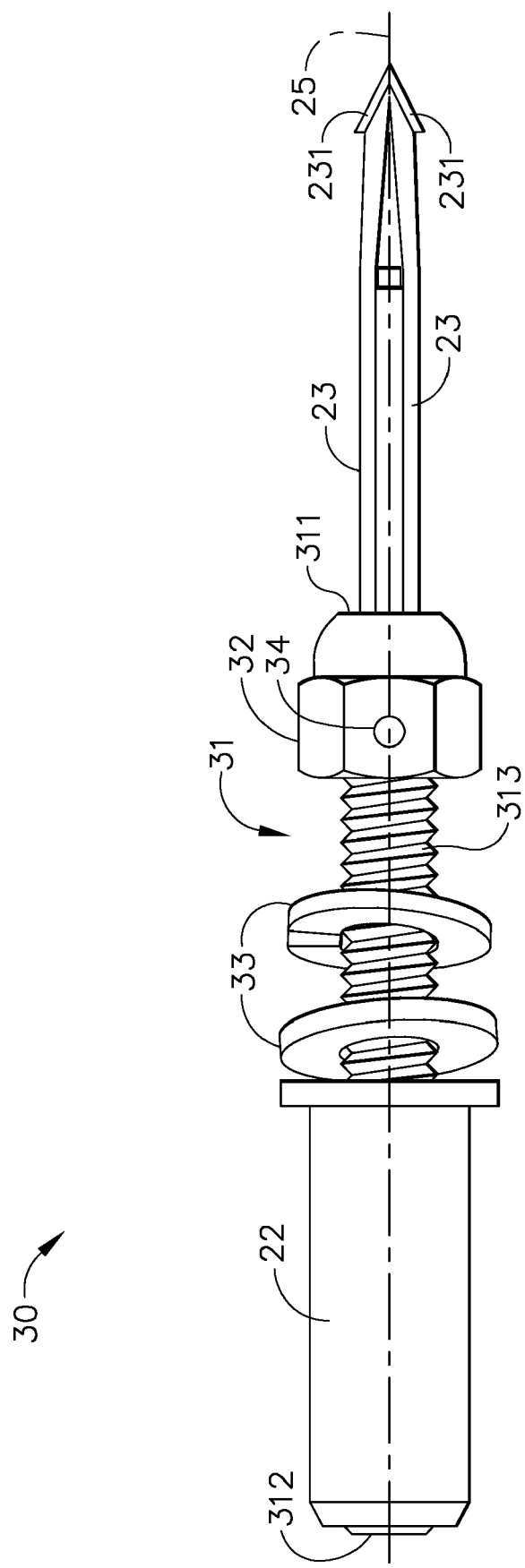
FIG. 3 is a side view of an internal assembly of the temporary fastener according to one embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides a clamping fastener grip indicator that combines a temporary structural fastener with a fastener hole length-measuring device. Currently, it is necessary to use a temporary structural fastener for holding a structure together and to use a length-measuring device for determining the length of a fastener hole. Contrary to the known prior art, an embodiment of the present invention provides direct determination of the grip length of a fastener while a structure is in a clamped-up position. The known prior art requires the removal of the temporary fastener from the fastener hole before the length of the fastener hole can be determined. The clamping fastener grip length indicator as in one embodiment of the present invention is suitable for, but not limited to, applications in the aerospace industry, for example, in the installation process of an aircraft airframe. By using the clamping fastener grip length indicator as in one embodiment of the present invention, it may be possible to eliminate the after installation inspection gauging as currently done, for example, during the aircraft airframe assembly.

In one embodiment, the present invention provides a temporary structural fastener with an integrated grip length indicator. The integrated grip length indicator directly indicates the grip length of the structural fastener and, therefore, the length of the fastener hole, while the temporary fastener is inserted in the fastener hole clamping a structure. Therefore, integrating the grip length indicator into a temporary structural fastener not only provides true structure thickness, but also eliminates the need for a separate length-measuring device. Consequently, length-measuring devices as currently used during installation processes, such as the installation of an aircraft airframe, do not have to be kept in an inventory and equipment costs may be lowered.

In one embodiment, the present invention provides a housing for a temporary structural fastener that includes a groove and a flattened area. The groove as in one embodiment of the present invention makes it possible to observe the internal parts of the fastener that change position during installation. Furthermore, an indicator dot may be permanently applied to a moving part of the fastener that is visible in the groove as in one embodiment of the present invention. The body of a prior art temporary structural fastener does not allow observation of the moving internal parts of the fastener. The flattened area as in one embodiment of the present invention includes a scale referencing the fastener grip length. After installation of the temporary structural fastener with an integrated grip length indicator as in one embodiment of the present invention, the indicator dot directly indicates the grip length of the installed faster, which is identical with the fastener hole length. The grip length may be read on the scale while the temporary fastener as in one embodiment of the present invention is installed. Known prior art temporary fasteners do not allow the determination of the fastener grip length while they are installed.

In one embodiment, the present invention provides a method for determining fastener grip length. Measuring the fastener hole length while a structure consisting of several panels is in a clamped-up position, as possible by using the temporary structural fastener with an integrated grip length indicator as in one embodiment of the present invention, may provide a more accurate determination of the fastener hole length than possible using prior art methods. Since a force is applied to the panels of the structure in the clamped-up position holding them tightly together, possible gaps between the panels may be eliminated and the fastener hole length may be determined with a higher accuracy than after removal of the temporary fastener, as done using prior art measuring devices. Since many installation processes, for example, the aircraft airframe installation, require the installation of temporary structural fasteners, integration of a grip length indicator into a temporary fastener as in one embodiment of the present invention may improve the cycle time compared to prior art methods for grip length indication. The integration of a grip length indicator into a temporary fastener may improve the cycle time by eliminating the steps of removing the temporary fastener from the fastener hole and inserting a measuring device in the fastener hole to determine the fastener hole length. By determining the grip length of a temporary fastener and, therefore, the length of a fastener hole, with higher accuracy than by using prior art methods, the correct selection of the fastener length of the structural faster to be permanently installed may also done with higher accuracy. Therefore, using the method for determination of the fastener grip length as in one embodiment of the present invention may reduce errors while selecting the correct permanent fastener and reduce the need to replace a permanent fastener after installation.

Referring now to FIG. 2, a perspective side view of a temporary clamping fastener with integrated grip length indicator 20 is illustrated according to one embodiment of the present invention. The temporary fastener 20 may include a body 21, a nut 22, two bearing wires 23, and a wedge 24. The temporary fastener 20 may be a clamping fastener used for holding a plurality of panels of a structure, such as panel 42, panel 43, and panel 44 of the structure 40 (shown in FIG. 4), in place until the structure is ready to be fastened permanently. The temporary fastener 20 may be similar, for example, to a Wedgelock™ temporary fastener manufactured by Monogram Aerospace Fasteners, Los Angeles, Calif., U.S.A. that may be used, for example, in the aircraft airframe installation process to temporarily hold a structure, such as substructure, sealant, and outer mold line skin, together. The body 21 may have a cylindrical shape and may extend longitudinally along an axis 25 from a front end 211 to a back end 212. The body 21 may house an internal assembly 30, illustrated in FIG. 3. The body 21 and the internal assembly 30 may have a grip length indicator 26 integrated. The grip length indicator 26 may include a flattened area 27, a groove 28, and an indicator dot 34. The flattened area 27 may be machined into a section of the body 21. The groove 28 may be cut into the body 21. The groove 28 may extend longitudinally along the axis 25 within the flattened area 27. The groove 28 may make it possible to observe the indicator dot 34. The flattened area 27 may include a scale 29. The scale 29 may have graduation marks 291 in grip lengths (typically $\frac{1}{16}$ inch increments). The scale 29 may reference the grip length 47 (shown in FIG. 4) of the fastener 20. The grip length 47 may be used for the selection of the fastener to be installed permanently in a particular hole 41 of a structure 40 (shown in FIG. 4). The nut 22 may be a captive nut that is partially covered by the body 21 and extends the body 21 at the back end 212 along the axis 25. The nut 22 may be rotated in one direction to install the temporary fastener 20 and may be rotated in the opposite direction to remove the temporary fastener 20 while the body 21 is held stationary. The two bearing wires 23 may extend the body 21 at the front end 211 along the axis 25 for a grip length 47. The bearing wires 23 may have the shape of hooked wires that include hooks 231 at the end opposite to the front end 211 of the body 21. The hooks 231 may contact the inner mold line 46 of a structure 40 (FIG. 4), and, therefore, enable clamping a structure, such as structure 40 shown in FIG. 4, even if the fastener hole 41 is a blind hole. The grip length 47 of the fastener 20 may be the length of the bearing wires 23 from the inner mold line 46 to the front end 211 of the housing 21 once the temporary fastener 20 is installed. The wedge 24 may be in a fixed position with the body 21 and may extend the body 21 along the axis 25 at the front end 211 between the two bearing wires 23. The wedge 24 may push the bearing wires 23 apart while a clamping force is applied and the bearing wires 23 are retracted (FIG. 4).

Referring now to FIG. 3, an internal assembly 30 is illustrated according to one embodiment of the present invention. The internal assembly 30 may include a threaded shaft 31 extending longitudinally along the axis 25 from a front end 311 to a back end 312. The internal assembly 30 may further include a hexagonal part 32 mechanically attached to the front end 311 of the shaft 31, and washers 33. The shaft 31 may have a double lead thread 313. The nut 22 may be screwed on the threaded shaft 31 at the back end 312. By holding the nut 22 at a fixed location along the axis 25 and by rotating the nut 22 the shaft 31 may be moved along the axis 25. The hexagonal part 32 may be mechanically attached to the bearing wires 23 and may prevent the bearing wires 23 from turning when the shaft 31 is moved using the nut 22. Since the hexagonal part 32 is in a fixed connection with the shaft 31 it will move as the shaft does. Therefore, an indicator dot 34 may be permanently attached to the hexagonal part 32, such that it may be visible in the groove 28 (shown in FIGS. 2 and 4).

Figure 4:
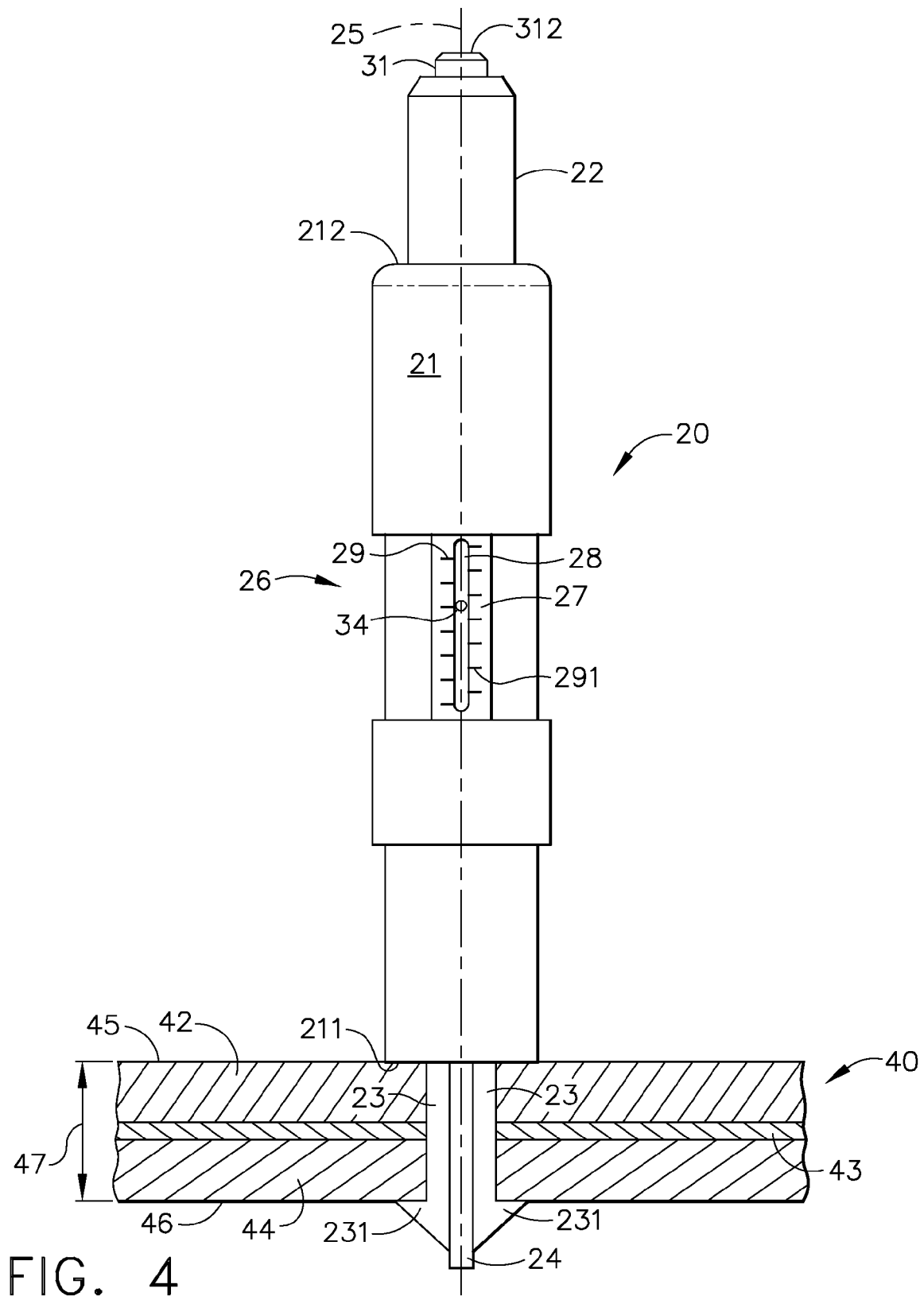
FIG. 4 is a front view of an installed temporary fastener with integrated grip length indicator according to one embodiment of the present invention.

Referring now to FIG. 4, an installed temporary fastener with integrated grip length indicator 20 is illustrated according to one embodiment of the present invention. The temporary fastener 20 is installed in a fastener hole 41 of a structure 40. The structure 40 may include a first panel 42, a second panel 43, a third panel 44, an outer mold line 45, and an inner mold line 46. For example, the structure 40 may be a part of an aircraft airframe. The first panel 42 may be the outer mold line skin, the second panel 43 may be a sealer or a shim, and the third panel may be the substructure. The structure 40 may consist of at least two panels, such as panel 42 and panel 44. The fastener hole 41 may be cut through all three panels 42, 43, and 44. The fastener hole 42 may be a blind hole and may not be accessible from the inner mold line 46 side of the structure 40. The temporary fastener 20 may be installed into the fastener hole 41 and may hold the three panels 42, 43, and 44 of the structure 40 in place until the structure 40 is ready to be fastened permanently. While the temporary fastener 20 is installed in the structure 40, the structure 40 will be in a clamped-up position. The bearing wires 23 may be inserted through the fastener hole 41. The body 21 of the temporary fastener 20 may be in contact with the outer mold line 45 of the structure 40 and may be held stationary. The nut 22 may be rotated manually, automatically, or by a robot. The rotation of the nut 22 may cause the threaded shaft 31 to move along the axis 25 away from the structure 40 until the hooks 231 of the bearing wires 23 contact the inner mold line 46 of the structure 40 and a predetermined clamp-up force is applied to the structure 40. While the rotation of the nut 22 may cause the bearing wires 23 to retract, the wedge 24 may push the bearing wires 23 apart. Since the hexagonal part 32 including the indicator dot 34 is permanently attached to the threaded shaft 31, the hexagonal part 32 and, therefore, the indicator dot 34 move as well. The indicator dot 34 may be observed through the groove 28. Once the temporary fastener 20 is installed in the fastener hole 41 providing a positive clamp-up to the structure 40, the position of the indicator dot 34 on the scale 29 is equivalent to the grip length 47 of the installed fastener 20 and to the length of the fastener hole 41, which is the distance from the inner mold line 46 to the outer mold line 45. The grip length 47 of the temporary fastener 20 may be read directly on the scale 29. Consequently, the grip length of the temporary fastener 20 and, therefore, the grip length of the fastener to be installed permanently, may be determined while the structure 40 is clamped-up. Since a temporary fastener is typically installed in each fastener hole 41 of a large structure 40, such as a aircraft wing or another part of an aircraft airframe, it may be possible by using the temporary fastener 20 as in one embodiment of the present invention to determine the correct fastener grip length 47 required for a particular hole 41 while the fastener 20 is clamping the panels of a structure, such as panels 42, 43, and 44 of the structure 40.

Figure 5:
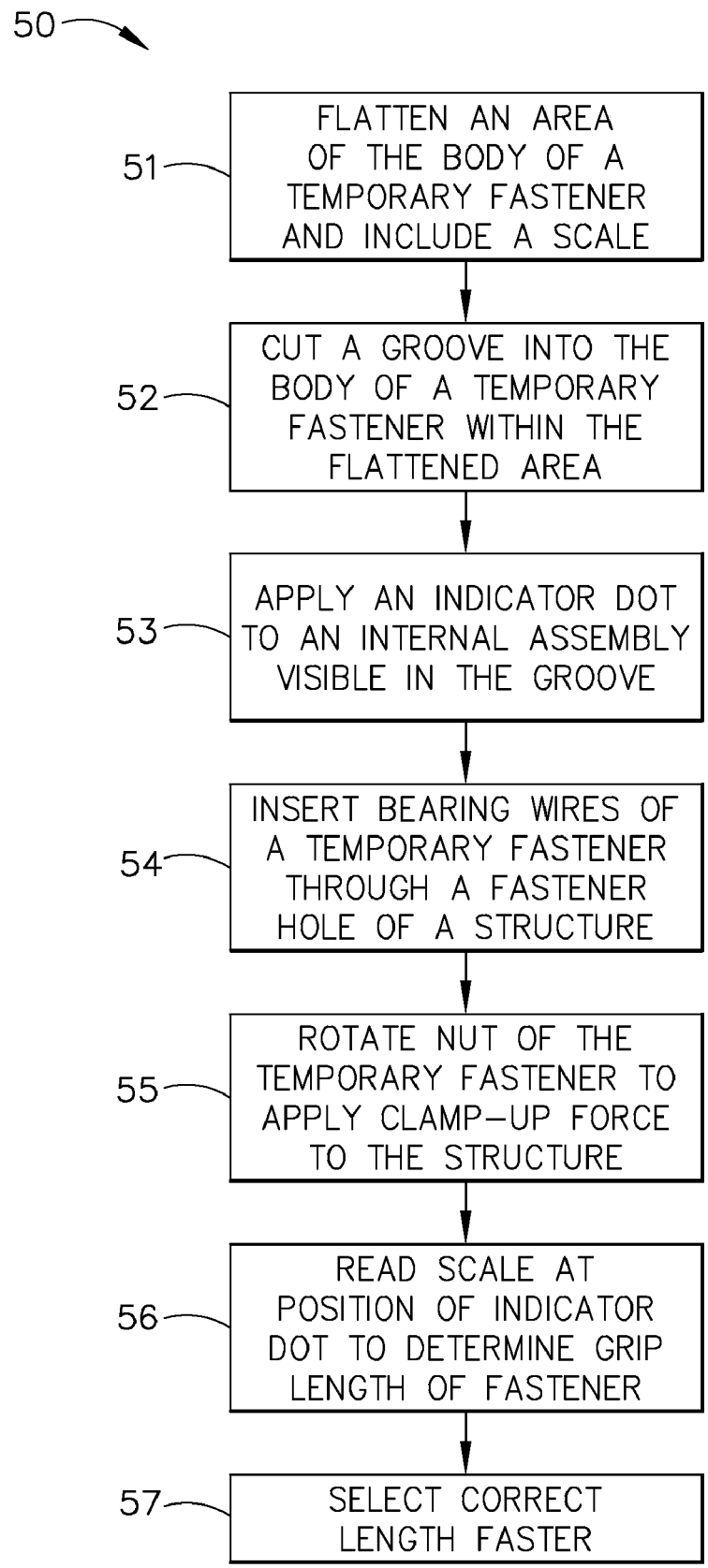
FIG. 5 is a flow chart of a method for determining of a fastener grip length according to another embodiment of the present invention.

Referring now to FIG. 5, a method 50 for determining a fastener grip length 47 is illustrated according to another embodiment of the present invention. The method 50 may include the steps of: machining a section of a body 21 of a temporary fastener 20 to create a flattened area 27 and engraving a scale 29 in the flattened area 27 (as shown in FIGS. 2 and 4) (step 51); cutting a groove 28 into the body 21 within the flattened area 27 (as shown in FIG. 2 and 4) (step 52); and applying an indicator dot 34 to an internal assembly 30 of the temporary fastener 20 (shown in FIG. 3) such that the indicator dot 34 is visible in the groove 28 (step 53). The temporary fastener 20 may now be inserted in a fastener hole 41 of a structure 40 consisting of a plurality of panels, such as panels 42, 43, and 44, by inserting bearing wires 23 through the fastener hole 41 in step 54 (shown in FIG. 4). The length of the fastener hole 41 may be identical with the distance from the inner mold line 46 and the outer mold line 45 of the structure 40 and may also be identically with the indicator grip length 47. In a following step 55, the shaft 31 may be externally manipulated to apply a clamp-up force to the structure 40. A nut 22 of the temporary fastener 20 may be rotated until the hooks 231 of the bearing wires 23 are in contact with the inner mold line 46 of the structure 40, as shown in FIG. 4, and until a clamp-up force is applied to the structure 40. Now, the position of the indicator dot 34 on the scale 29 indicates the grip length 47 of the temporary fastener 20 as well as the length of the fastener hole 41. The grip length 47 may be read on the scale 29 in step 56. Since the grip length 47 of the temporary faster 20 may be identical with the grip length 47 of a fastener to be installed permanently, the correct fastener may be selected in step 57 using the determined grip length 47. The method 50 may be used for the effective determination of the correct fastener grip length 47 for fastener holes 41 of a large structure 40, such as an aircraft airframe assembly.

It should be understood, of course, that the foregoing relates to exemplary embodiments of the invention and that modifications may be made without departing from the spirit and scope of the invention as set forth in the following claims.

We claim:

1. A method for determining a fastener hole length, comprising:
    forming a temporary fastener that includes a cylindrical-shaped body having a longitudinal axis, and a moveable member that is moveable along said longitudinal axis relative to said cylindrical-shaped body, wherein said moveable member is mounted on a shaft that extends from a rotatable member, and wherein forming said temporary fastener comprises:
        providing a scale on said cylindrical-shaped body:
        providing a groove in said cylindrical-shaped body adjacent said scale: and
        providing an indicator on said moveable member:
    inserting said temporary fastener into a fastener hole of a structure having a thickness;
    applying a clamp-up force to said structure with said temporary fastener, wherein applying said clamp-up force comprises rotating said rotatable member to move said shaft and said moveable member mounted thereon along said longitudinal axis to move said indicator relative to said scale;
    observing said indicator through said groove; and
    reading said scale at the position of said indicator to determine a length of said fastener hole.

2. The method of claim 1, wherein providing a scale on said cylindrical-shaped body comprises:
    forming said scale on a flattened area of said cylindrical-shaped body; and wherein providing a groove in said cylindrical-shaped body adjacent said scale comprises providing said groove in said flattened area.

3. The method of claim 2, wherein forming said scale on a flattened area comprises:
    engraving graduation marks into said flattened area.

4. The method of claim 1, further comprising selecting a permanent fastener to be installed permanently according to the determined length of said fastener hole.

5. The method of claim 4, further comprising:
    removing said temporary fastener from said fastener hole; and
    installing said selected permanent fastener into said fastener hole.

6. The method of claim 1. wherein said shaft comprises a threaded shaft, and wherein said moveable member comprises a threaded moveable member mounted on said threaded shaft.

7. A method for determining a fastener grip length of a fastener used in an aircraft airframe assembly, comprising:
provuding a scale on a cylindrical-shaped body of a temporary fastener;
providing a groove in said body adjacent said scale;
providing an indicator on a moving part of an internal assembly of said temporary fastener, wherein said moving part comprises a moveable member that is mounted on a shaft that extends from a rotatable member;
inserting bearing wires of said temporary fastener into a fastener hole of said aircraft airframe assembly having an inner mold line and an outer mold line;
positioning said cylindrical-shaped body on said outer mold line;
retracting said bearing wires by rotating said rotatable member to move said shaft and said moveable member mounted thereon along a longitudinal axis of said cylindrical-shaped body to move said indicator relative to said scale until said bearing wires contact said inner mold line;
applying a clamp-up force to said airframe assembly;
reading said scale at a position of said indicator to determine a distance from said inner mold line to said outer mold line; and
selecting a permanent fastener to be installed in said aircraft airframe assembly in accordance with said determined distance.

8. The method of claim 7, wherein said shaft comprises a threaded shaft that is connected with said bearing wires.

9. The method of claim 7, further comprising observing said indicator through said groove.

10. A method for assembling an aircraft airframe, comprising:
integrating a grip length indicator into a cylindrical-shaped body and an internal assembly of a temporary fastener; wherein said cylindrical-shaped body includes a slot positioned within an area of said cylindrical-shaped body, wherein said area includes a scale, wherein said scale includes graduation marks in grip length, wherein said internal assembly includes an indicator visible in said slot, and wherein said indicator is on a moving part of said internal assembly, wherein said moving part comprises a moveable member that is mounted on a shaft that extends from a rotatable member;
installing said temporary fastener including said grip length indicator into a fastener hole extending from an outer mold line to an inner mold line of a structure formed by substructure and an outer mold line skin fitted on said substructure;
applying a clamp-up force to said substructure and said outer mold line skin with said installed temporary fastener, wherein applying said clamp-up force comprises rotating said rotatable member to move said shaft and said moveable member mounted thereon along a longitudinal axis of said cylindrical-shaped body to move said indicator relative to said scale; and
indicating a distance from said outer mold line to said inner mold line of said structure with said grip length indicator.

11. The method of claim 10, further comprising reading the position of said indicator relative to said graduation marks to determine said grip length of said installed temporary fastener, wherein said grip length is equivalent to said distance from said outer mold line to said inner mold line.

12. The method of claim 10, further comprising:
selecting a permanent fastener to be installed permanently into said fastener hole according to the determined grip length of said installed temporary fastener;
removing said temporary fastener from said fastener hole; and
permanently installing said selected permanent fastener into said fastener hole.

\* \* \* \* \*